May 7, 1929.　　　　A. J. BRESSAN　　　　1,711,517
ELECTRIC COOKING DEVICE
Filed Aug. 20, 1926　　　3 Sheets-Sheet 1
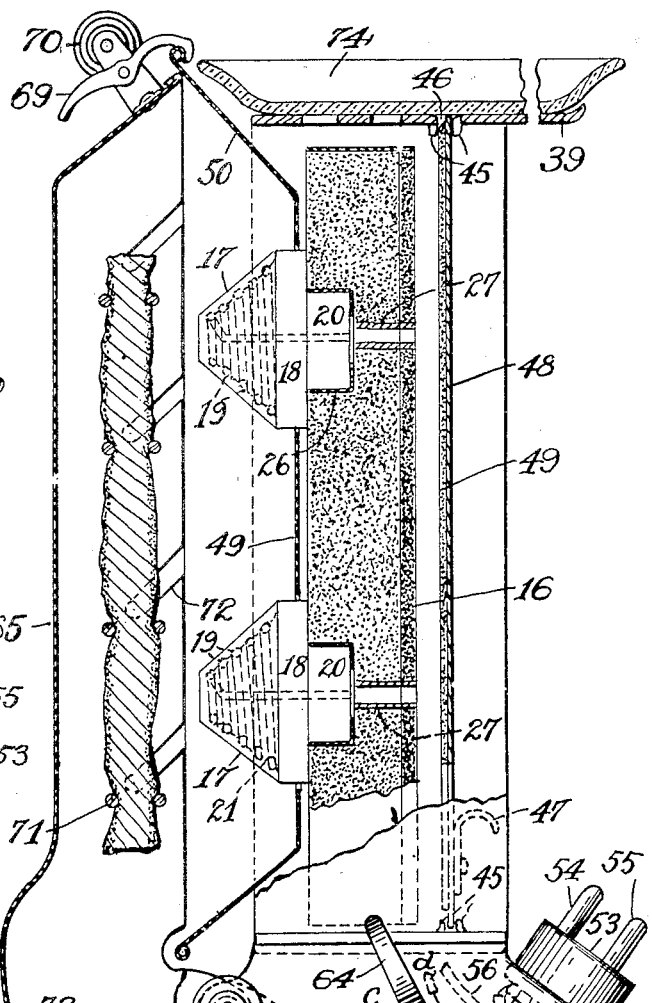
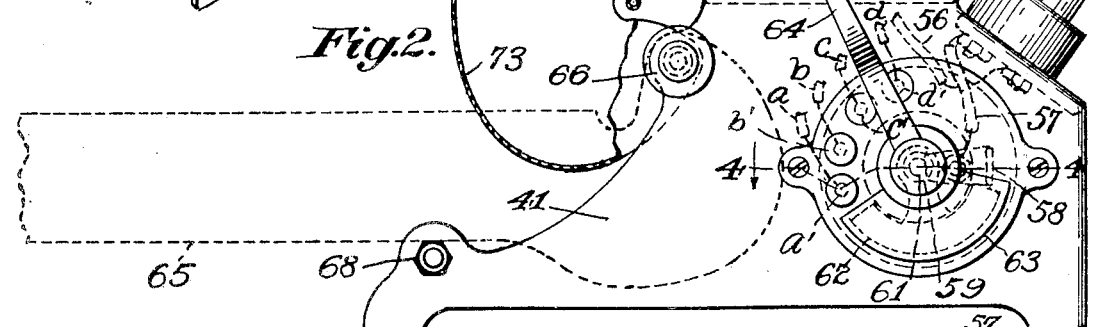
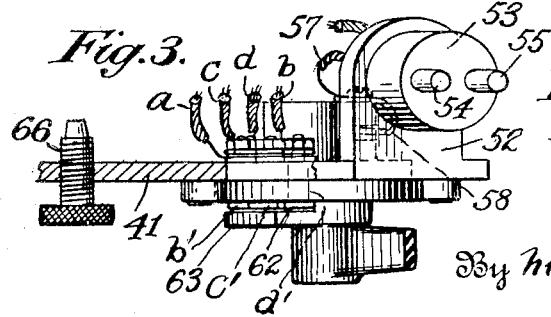
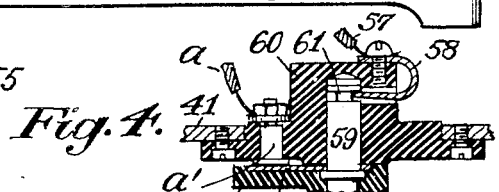
Inventor
A. J. Bressan
By his Attorney

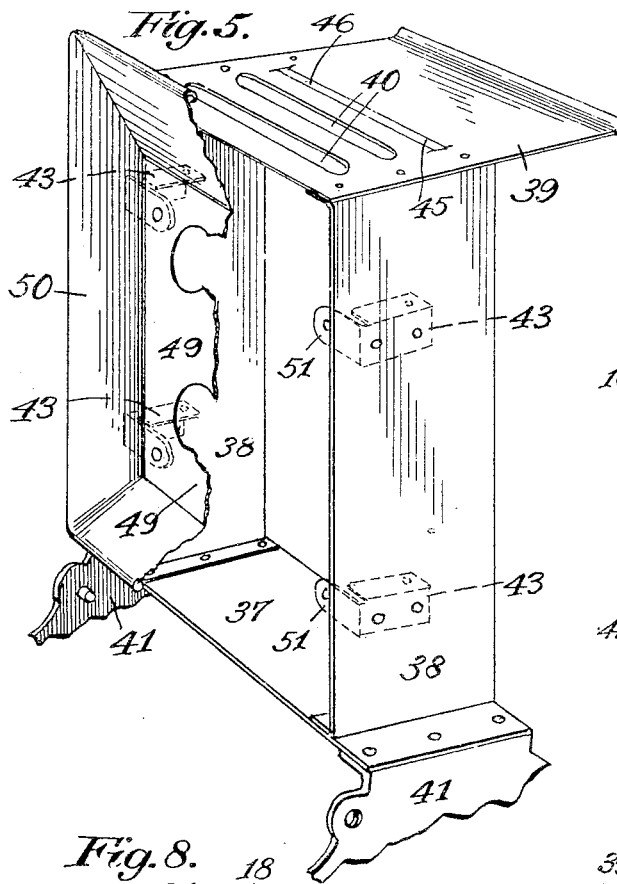
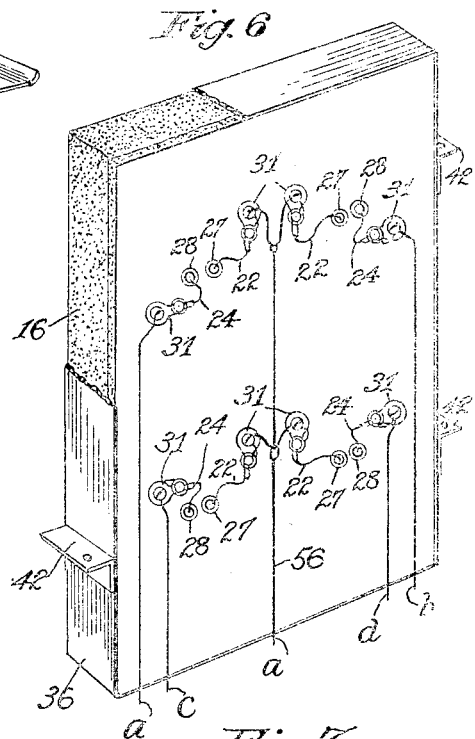
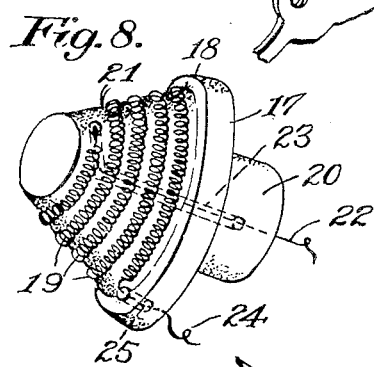
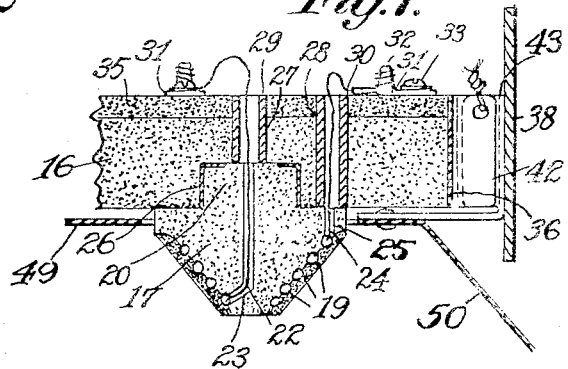
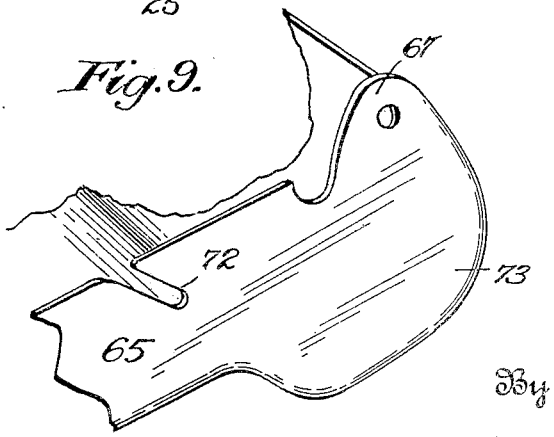
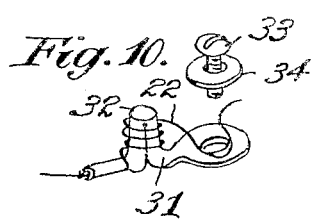

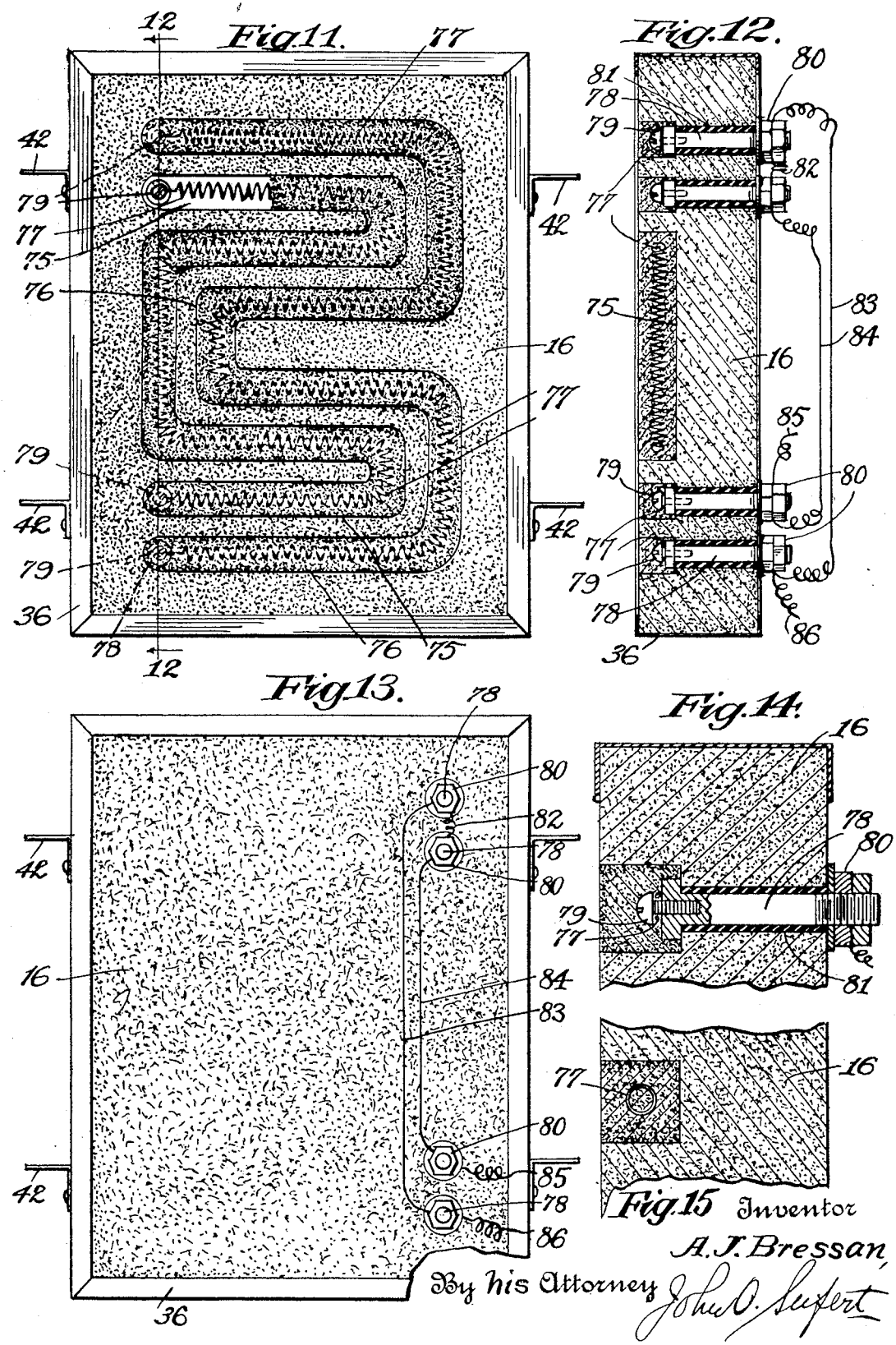

Patented May 7, 1929.

1,711,517

UNITED STATES PATENT OFFICE.

ANTHONY J. BRESSAN, OF PLAINFIELD, NEW JERSEY, ASSIGNOR TO ELECTRO THERMAL UNIT COMPANY, A TRUST ESTATE, OF PHILADELPHIA, PENNSYLVANIA.

ELECTRIC COOKING DEVICE.

Application filed August 20, 1926. Serial No. 130,507.

This invention relates to electric cooking devices, and it is the object of the invention to provide an electric cooking device particularly adapted for use as a broiler wherein the article is cooked by radiant heat rays and to provide an electric broiling device which is simple in structure and efficient in use.

In radiant heating devices it is the usual practice to provide a high resistance electric conductor and mount the same upon a carrier of refractory material to be exposed to the atmosphere, said conductor being heated to incandescence by the resistance of the material of the conductor or to the passage of the current therethrough. However, due to the exposure of the conductor to the atmosphere and the heating thereof to a high temperature and cooling of the material it quickly deteriorates and becomes useless. It is a further object of the invention to overcome this disadvantage by providing a radiant heating unit wherein the resistance conductor is sealed from the atmosphere and moisture by embedding the same in a material having high thermal conductivity and a non-conductor of electricity, which material is adapted to be rendered incandescent by an electric current passing through the conductor, and said heating unit being arranged as an exposed radiant surface by a plate or brick of material which has the properties of being a good heat resistor, a non-conductor of electricity and as a heat deflector.
It is is another object of the invention to provide in an electric cooking device of this character regulatable means for producing a heat of variable temperature.

Other objects and advantages will hereinafter appear.

In the drawings accompanying and forming a part of this specification Figure 1 is a perspective view looking at the front and one side of an electric cooking device embodying the present invention, and showing the parts in position when cooking, the same being also adapted for the supporting of a dish or dishes for warming the same simultaneously with the cooking of an article.
Figure 2 is a side elevation of the cooking device illustrating one embodiment of my improved heating unit and being partly in section to show the relation of an article to the heating means as it is being cooked and showing in dotted lines another position of the article carrier.

Figure 3 is a top view of regulating means for controlling the temperature of the heat mounted on the frame of the device.

Figure 4 is a cross sectional view of the heat controlling means taken on the line 4—4 of Figure 1 looking in the direction of the arrows.

Figure 5 is a perspective view on an enlarged scale and partly broken away of the supporting frame in which the heating unit is mounted.

Figure 6 is a perspective view of the carrier for the heating unit looking at the back thereof, with a frame extending around the marginal portions partly broken away.

Figure 7 is a cross sectional view of an element of the heating unit shown in Figure 2 and showing the manner of mounting the same on its carrier in electrical connection with terminal connectors arranged on the carrier.

Figure 8 is a perspective view of a heating element of the heating unit shown in Figure 1 previous to applying an enclosing material over the conductor.

Figure 9 is a perspective view of a fragment of the carrier for the article to be cooked and whereby the article is positioned relative to the heating unit, and showing the same with an outwardly bulged portion to serve as a receiver for drippings from an article as it is being cooked.

Figure 10 is a perspective view of the terminal connector mounted on the carrier for the heating unit for connection of the heating element and connecting the same with a source of electricity.

Figure 11 is a front elevation of the heating unit and its carrier showing a modified arrangement of the heating element.

Figure 12 is a cross sectional view taken on the line 12—12 of Figure 11 looking in the direction of the arrows.

Figure 13 is a view of the heating unit shown in Figure 11 looking at the rear thereof.

Figure 14 is an enlarged sectional view of a portion of the heating unit to show the manner of mounting terminal connectors thereon for the connection of the terminal of a resistance element and for conductors leading from a source of electricity; and Figure 15 is a sectional detail view of the heating unit shown in Figure 11 to show the construction, arrangement and mounting of the heating element.

In carrying out the embodiment of the invention shown in Figures 1 to 9 there is provided a carrier 16 in the form of a brick or plate of rectangular shape, although it may be of different shape, of heat resisting material and having the properties of being a non-conductor of electricity, diatomaceous earth having been found suitable for the purpose since such material does not absorb heat but acts to deflect heat therefrom. A radiant heating element or elements is carried upon or in one face of said plate. As shown in Figures 2, 7 and 8 a series of elements are provided, each element comprising a body portion 17 of molded material having high thermal conductivity and having the properties of a non-conductor of electricity, and adapted to be rendered incandescent and radiate heat therefrom by an electric current passed through a conductor embedded in said material. The material commonly termed "alundum grains" intimately united in compact form while in a plastic state by a cementitious material, such as a suitable colloidal material or clay being found efficient for the purpose. This body 17 has an electric current conductor 19 embedded therein of high resistance material, nichrome wire being advantageous for this purpose, in the form of a coil arranged in spiral form. While this body may be of various forms as shown in Figure 4 it is of truncated conical form with an annular enlargement 18 at the base to form a shoulder at the juncture of the base of the cone and said enlargement, and having a projection or stem 20 extending from the enlargement 18 opposite to the cone, said projection being of reduced diameter. A spiral recess 20 is arranged about the peripheral wall of the body in which the conductor 19 engages with one terminal 22 extended through a passage 23 in the body having an opening in the peripheral wall of the cone adjacent the apex and passing axially through the cone and connected stem 20. The other terminal 24 of the conductor is passed through a passage 25 through the enlargement 18 at the juncture thereof with the base of the cone. As so arranged material the same as that from which the body is made is applied in a plastic state over the conductor wire to enclose the same. The heating element so formed is mounted upon the plate 16 by engaging the body projection 20 in a recess 26 in one face of the plate with the shoulder formed by the reduced portion 20 abutting against the face of the plate. The plate has perforations 27, 28 for the passage of the terminals 22, 24 of the resistance member 19, the perforations 27 being axially of the recesses 26 in line with the passage 23 and the other passage 28 to register with the passage 25. The plate perforations have suitable insulator bushings 29, 30 therein. The terminals of the resistance element are connected to connectors 31 (Figure 10). The terminals of the resistance element have two or more turns thereof coiled about a projection 32 and secured to the connectors by a screw 33 passed through a perforation in the connector with a washer 34 interposed between the screw and connector serving to mount the connectors upon the plate 36. The screws and connectors also serve to connect a lead in wire from a source of electricity with the resistance element. By the arrangement of winding the terminals of the resistance element about a part of the connectors as described the heat generated by the resistance of the resistance wire to the passage of the current which causes said wire to become brittle and quickly deteriorated is distributed in the material of the connectors. A sheet of heat insulating material 35, such as asbestos, may be arranged at the back of the plate 16, and in the use of such a sheet the connectors 31 are mounted thereon.

A metallic strap 36 is engaged about the marginal or edge portion of the plate 16 and whereby it is mounted in a frame of a shape to conform to the shape of the plate and comprising a base 37, sides 38 connected to the base and a top 39 connected to the sides, the top having perforations 40 therein and being of a size to extend laterally or rearwardly of the sides as shown. The base, sides and top form an open frame which is supported upon feet 41 secured to the ends of the bottom extended beyond the sides. While the frame has been illustrated and described as having a bottom, sides and top made of separate pieces it will be obvious it may be made of one piece. The heat unit is mounted in said frame by brackets 42 fixed to the plate enclosing strap 36 secured upon brackets 43 fixed to the sides of and within the frame. The back of the heating unit is enclosed in the frame by a metal plate 44 removably mounted in the frame. For this purpose pairs of opposed lugs 45 are stamped from and bent inward from the top and bottom of the frame members, the closure plate 44 being of a length so that the opposite ends will engage between the lugs 45. The lugs in the top may be of a length equal to the distance between the sides forming an opening 46 in the top (Figure 5). To insert the back plate the upper end is passed through said opening 46 when the lower end may be engaged and seated between the lugs in the bottom when the plate is lowered, the removal of said back plate being facilitated by a fingerpiece 47 fixed thereto. The inner face of the plate may be provided with a sheet of heat insulating material 48, such as asbestos.

To reflect and deflect the heat rays forwardly from the heating elements 17 a deflector 49 is provided, this being in the form of a sheet having perforations for the passage of the heating elements so that the sheet may lie contiguous to the face of the plate 16, the ends of the sheet being bent forwardly to form sides 50 diverging or inclining outward from the bottom (Figures 2 and 5) and mounted in the frame by riveting or otherwise to ears 51 on the heating unit supporting brackets 43.

In the arrangement shown in Figures 2 and 6 a series of four heating elements are provided. For this purpose there is mounted upon a lateral extension 52 of one of the frame supporting feet 41 an electric connection member 53 having a pair of prong contact terminals 54, 55 for the releasable connection of a connector connected to lead in conductors from a source of electricity. One of the connector contact prongs, in the present instance the prong 55, has a conductor 56 connected to the connectors 31 to which the terminals 22 of the resistance member 19 of the heating elements are connected. The other connector contact prong 54 is connected by a conductor 57 with a resilient contact making member 58 fixed to an insulator mounting member 60 for circuit controlling means mounted in the frame supporting foot upon which the connector 53 is mounted. The contact 58 has rubbing contact with a stud 59 of conducting material rotatably mounted in the mounting member 60 by engaging a reduced portion of said stud in a bifurcation of the contact 58, as shown at 61 in Figure 4. The stud 59 has fixed thereon a contact maker 62 of segmental form by mounting the same in an insulator carrier 63 therefor. The other terminals 24 of the resistance elements 19 of the heating units are connected through the connectors 31 and conductors $a$, $b$, $c$ and $d$ with contacts $a'$, $b'$, $c'$ and $d'$ carried by the mounting member 60 in insulated relation to each other. The circuit is closed through one or more of the contacts $a'$, $b'$, $c'$ and $d'$, the segment contact 62, stud 59 connected with the one contact prong 54 of the connector 53 through 58 and conductor 57 and the conductor 56 connected to the other contact prong 55 of the connector 53. The contact segment 62 is actuated by a lever 64 of insulator material fixed to the stud 59.

For the purpose of cooking an article a holder is provided to position the article in the radiant heat zone of the heat element or elements, and comprising a pan-like structure 65 pivotally mounted upon the frame supporting feet by pivot studs 66 having knurled heads threaded from the outside into said feet, the ends of said studs being of conical form and adapted to engage in perforations in ears 67 arranged on the sides at opposite corners. The opposite sides and one end to constitute the top diverge or flare outward to have contact with the diverging walls of the deflector 39, as shown in Figure 2. The heating unit is arranged in said supporting frame to extend in a vertical direction, and the pan 65 is supported at its opposite lower corners and adapted to be moved to position in front of the heating element, or to extend in a horizontal plane and supported in said latter position by a rod 68 extending transversely between and connecting the frame supporting feet and retained in its vertical position in front of the heating unit by a latch 69 pivotally carried by a handle 70 fixed to the top of the pan engaged over the edge or top of the deflector 49.

To support an article, indicated at A, such as chops, a steak or the like in the holder or pan to position such article in the zone of the heat radiated from the heating element to cook the same, commonly termed "broiling" the article is placed in a grill 71 and the grill is arranged with means for engagement in inclined slots 72 cut into the edge of the opposite walls of the holder. To catch and hold any drippings from an article as it is being cooked the holder pan at the bottom and one end to constitute the bottom when the holder is in article cooking position is bulged outwardly, as at 73, forming a depression in said portion of the holder extending below the bottom and outward from the side of the pan, which depression will be below the bottom of the holder when in horizontal position as shown in dotted lines in Figure 2, thus retaining the drippings in said outwardly bulged portion of the holder in all positions thereof, which drippings may be removed by a spoon or the holder may be released from its supporting studs 66 and the same poured from one corner of the holder. By arrangement of the openings 40 in the top of the supporting frame heat is adapted to pass therethrough, and by extending the top laterally it serves as a shelf for dishes 74 to warm the same during the cooking process. In the embodiment of the invention shown in Figures 11 to 15, inclusive, which may be the preferred form of the invention, the carrier for the heating element or elements is in the form of a brick or plate of heat resisting and non-conducting material the same as is shown in Figure 6. However, instead of recessing the heating elements in the face of said carrier and having a portion projecting therefrom the entire heating element or elements is recessed into the face of the carrier with the outer surface of the heating element flush with the face of the carrier, thus arranging the heating element in the form of a vein or veins in the face of the carrier. For this purpose there is provided in the face of the carrier one or more recesses, in the present instance two in number 75, 76 of irregular form and of rectangular shape in cross sections. The heating elements comprise a coil of high resistance conductor material 77 embedded in a material having high thermal conductivity and a non-conductor of electricity, the same as the material from which the heating elements 19 are made. The heating elements are connected with a source of electricity by connectors in the form of studs 78 engaged from the back of the carrier in openings communicating with the terminals of the recesses 75, 76, the terminals of the conductors being connected to said connectors by engaging a screw 79 in a loop at the ends of the coils of the resistance conductors and threaded into the ends of the studs. The opposite ends of the studs project from the back of the plate 16 and have binding nuts, as shown at 80, threaded thereon for the connection of conductors for electrically connecting the studs with each other and a source of electricity. The openings in the plate 16 through which the studs extend may have insulator bushings 81 arranged therein. To electrically connect the resistance elements a connector post of each element is connected by a conductor 82, and one of said connected posts is connected by a conductor 83 with a post connected to the other terminal of one resistance element, and the other of said posts connected by a conductor 84 with the connector post connected with the connector of the other resistance element, and said latter posts connected by conductors 85, 86 with a source of electricity.

It will be obvious that various modifications may be made in construction and arrangement of parts, and that portions of the invention may be used without others and come within the scope of the invention.

Having thus described my invention I claim:

1. In an electric cooking device, a frame, a heating unit embodying a series of elements, a carrier for said heating unit removably supported in the frame, terminal connectors mounted on said carrier for the connection of the terminals of the elements of the heating unit, and means electrically connected with the terminal connectors and adapted for connection with a source of electricity to connect one or more of the elements of the heating unit in an electric circuit.

2. In an electric cooking device as claimed in claim 1, a holder pivotally carried by the frame and adapted to carry articles to be cooked in opposed relation to the elements of the heating unit.

3. In an electric heating device, a frame, a plate of heat insulating and non-conducting material, heating elements mounted in one face of said plate comprising truncated conical cores of material having high thermal conductivity with perforations therethrough to register with perforations in the plate, and a spiral groove about the periphery thereof, a high resistance conductor arranged in the spiral groove with the terminals passed through the perforations, and a layer of the same material as the core applied to and enclosing the conductor and said material and the core adapted to be rendered incandescent by the passing of a current through the conductor, and thermal connectors mounted on the face of the plate opposite to the heating elements for connection of the conductor terminals of the heating elements and of conductors leading from a source of electricity.

4. In an electric heating device as claimed in claim 3, wherein the heating elements have a central projection extending from the base for engagement in enlargements of certain of the perforations in the insulator plate.

5. In an electric heater, a plate of heat insulating and non-conducting material, radiant electric heating elements mounted upon said plate, each element comprising a truncated conical body of material having high thermal conductivity and a non-conductor of electricity, a spirally arranged wire of resistance material embedded in the material of said body, terminal connectors mounted on the plate for electric connection with said heating elements and for connecting the same with a source of electricity.

6. In an electric heating device, a plate of heat insulating and non-conducting material, a series of radiant electric heating elements mounted on the plate, each element comprising a body of refractory material having high thermal conductivity with the electric conductor embedded therein and capable of rendering the material incandescent by the passing of a current through the conductor, and terminal connectors mounted on the insulating plate adapted to connect the heating elements with a source of electricity.

7. An electric cooking device as claimed in claim 6, wherein the heating elements comprise a core having a high resistance electric conductor coiled about the core and a layer of the same material as the core applied to and enclosing the conductor, said core and the conductor enclosing material being adapted to be rendered incandescent by an electric current passed through the conductor.

8. In an electric heating device, a plate of heat insulating and non-conducting material arranged with perforations therethrough, heating elements adapted to be mounted upon the plate comprising a body of material having high thermal conductivity and a non-conductor of electricity with an electric conductor embedded therein having the terminals extended through perforations in the body to coincide with the perforations in said plate, and terminal connectors arranged on the insulator plate for connection of the conductor terminals with a source of electricity.

9. In an electric heating device as claimed in claim 8, means connected to the connectors arranged for connection with a source of electricity operative to connect one or more of the heating elements in circuit therewith.

10. In an electric cooking device, a supporting frame, a plate of heat resisting and non-conducting material carried in vertical position in the frame, a radiant electric unit carried by the plate for exposure from one face thereof, a pan pivotally mounted on the frame and movable toward the heating unit to extend in vertical position in front thereof and away from the heating unit and supported in a horizontal position, said pan being arranged to support means for positioning an article to be cooked relative to the heating unit when in vertical position, arranged with an outwardly bulged portion at one end adapted to receive drippings from an article being cooked and retain said drippings in said bulged portion when moved to horizontal position.

Signed at New York city, in the county of New York and State of New York, this 17th day of July, 1926.

ANTHONY J. BRESSAN.